Figure 1:
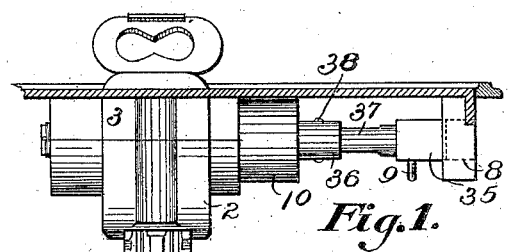

No. 691,124. Patented Jan. 14, 1902.
A. R. FERGUSSON.
LOCK.
(Application filed May 9, 1901.)
(No Model.) 2 Sheets—Sheet 1.

Witnesses:
H. Jacobs
Frank G. Campbell.

Inventor:
Alan R Fergusson.
By his Attorney,
F. H. Richards.

No. 691,124. Patented Jan. 14, 1902.
A. R. FERGUSSON.
LOCK.
(Application filed May 9, 1901.)
(No Model.) 2 Sheets—Sheet 2.
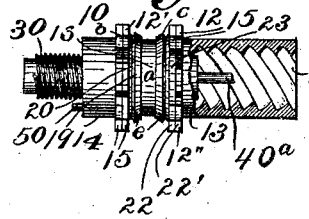
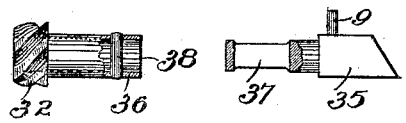
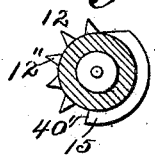
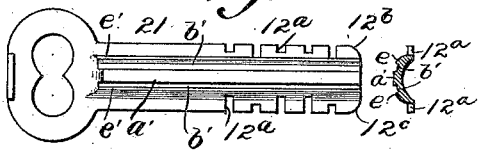
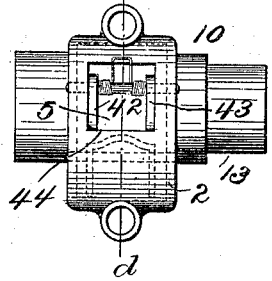
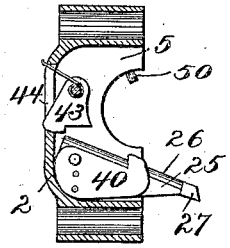
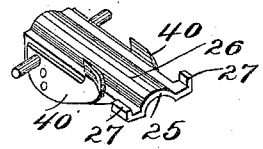
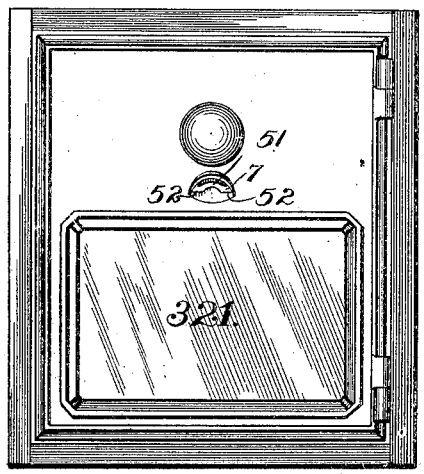
Witnesses:
H. Jacobs.
Frank G. Campbell.
Inventor:
Alan R. Fergusson
By his Attorney.
F. H. Richards.

UNITED STATES PATENT OFFICE.

ALAN R. FERGUSSON, OF NEW YORK, N. Y.

LOCK.

SPECIFICATION forming part of Letters Patent No. 691,124, dated January 14, 1902.

Application filed May 9, 1901. Serial No. 59,370. (No model.)

*To all whom it may concern:*

Be it known that I, ALAN R. FERGUSSON, a citizen of the United States, residing in New York city, in the county of New York and State of New York, have invented certain new and useful Improvements in Locks, of which the following is a specification.

This invention relates to locks, the object of the invention being to provide an improved lock simple in construction and operation, effective in use, and inexpensive to manufacture.

A further object of the invention is to provide an improved lock so constructed that it is non-pickable.

A further object of the invention is to provide an improved lock in which the means engaged by the key is positively locked against movement until released by the proper key.

A further object of the invention is to provide an improved lock in which the means which controls the bolt is locked against movement until released by the proper key by a pair of independent locking means, whereby should one of such means be thrown out of operation by improper means the other will be effective to lock such bolt-controlling means against movement, thereby to prevent the unlocking of the bolt.

A further object of the invention is to provide an improved key-guiding means so constructed that not only is a particular form of key required to operate the bolt-controlling means, but the insertion of any but the proper key in the lock is prevented.

The present improvement, while it may be used for various purposes, is particularly adapted to use with post-office mail-boxes; and it is an improvement in part upon the lock shown and described in my prior patent, No. 643,955, dated February 20, 1900. In said patent the tumbler is so constructed that a particular form of key requiring cut-out portions located so as not to intersect the edges is necessary. Very frequently a locksmith to whom is brought a key of the construction required to operate the lock shown in said patent has not the means of forming such key. Consequently it is necessary to provide a lock in which a key can be used which any ordinary locksmith can duplicate with but little expense and labor. To this end one of the objects of the invention is to provide an improved lock in which the means which controls the bolt is so constructed that it will require only a key which can be readily duplicated by a locksmith, but which construction, however, is such that the use of any but the proper key will not operate the lock. In my said patent hereinbefore referred to the tumbler is maintained against rotary movement by a locking means manipulated by the end of the key after the tumbler has been partially shifted or rotated. In the present instance, however, I have provided a locking means for the tumbler which must be manipulated by the key before the tumbler can be rotated at all.

Figure 2:
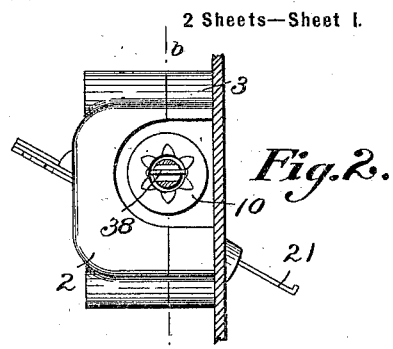
Figure 3:
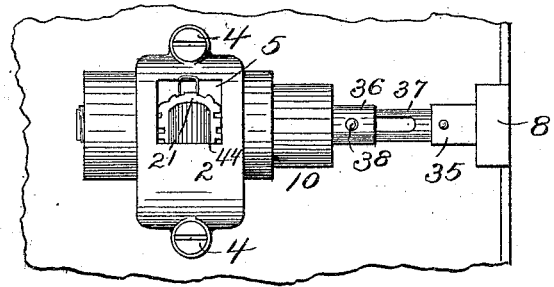
Figure 4:
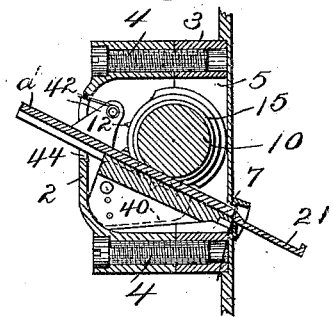
Figure 5:
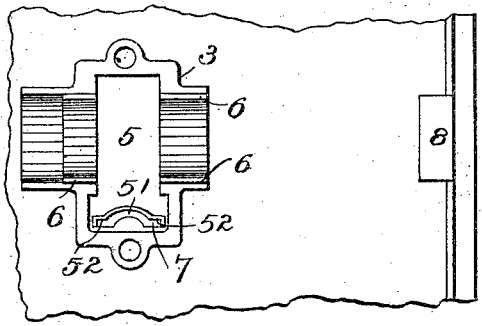
Figure 6:
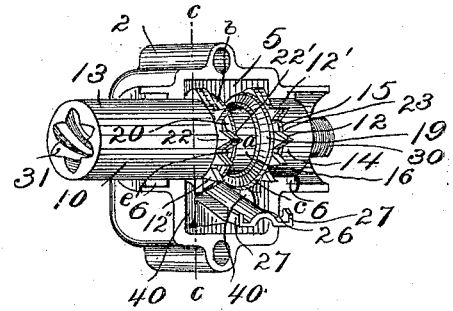
Figure 7:
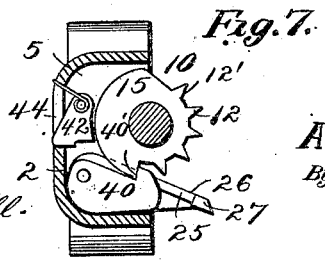

In one form of this improved lock shown in the drawings accompanying and forming part of this specification, Figure 1 is a top view of this improved lock with the face-plate of the casing shown in section, the key being in position with the bolt withdrawn. Fig. 2 is a view of one side thereof, partly in section. Fig. 3 is a rear view of the lock shown in Fig. 1 with the key inserted. Fig. 4 is a view of a part of the casing attached to the face-plate. Fig. 5 is a cross-sectional view taken substantially in line $b\ b$, Fig. 2. Fig. 6 is a perspective view of the bolt-controlling means assembled in a part of the lock-casing. Fig. 7 is a cross-sectional view taken in line $c\ c$, Fig. 6. Figs. 8, 9, 10, 11, 12, 13, and 14 are detail views of the various elements comprising the lock and the means for operating it. Fig. 15 is a view of the rear side of said lock. Fig. 16 is a cross-sectional view taken in line $d\ d$, Fig. 15; and Fig. 17 is a view of the door constituting when the lock is applied to post-office city boxes the face-plate of such lock, which, however, may be formed as a part of the lock-casing itself, if preferred.

Similar characters of reference designate corresponding parts in the different figures of the drawings.

The lock-casing may be of any suitable form or construction adapted for the purpose; but in the present instance it is shown comprising a pair of casing members 2 and 3, secured together by screws 4, such casing members forming a chamber 5 for the reception of the major part of the lock mechanism and having a pair of sleeves 6, forming journal boxes or bearings for the bolt-controlling means, shown in the present instance as a rotary member. One member of this casing is usually secured to the article, as a door or otherwise, to which the lock is to be attached. In the present instance it is shown attached to the door of a post-office letter-box, for which purpose the door forming the face-plate of the lock is shown provided with a suitable keyhole 7 of peculiar construction, requiring the use of a particular form of key in order to manipulate the lock. The door is also provided with a suitable guideway 8 for the reception of the bolt-head, the outward movement of which is limited by a suitable stop, such as a pin 9.

The bolt-controlling means in the present instance comprises a rotary member 10, designated herein for the present purposes as a "tumbler" and formed as barrel-shaped and shown provided with projections 12. In the present instance the tumbler is formed with journals 13 and 14, supported for rotation in the sleeves 6 of the casing. The projections corresponding to recesses in the key are shown carried by disks, which comprise in the present instance two sets separated from each other by a central portion of the tumbler carrying circumferential key-engaging means, shown as ribs and grooves corresponding with longitudinally-extending recesses and ribs formed in the key. It will of course be understood that various constructions of tumblers may be provided, one of which is shown in the present instance. The form shown comprises two sets of projections 12' and 12'', each set formed by a pair of disk-shaped members 15, such projections being in position to register with recesses 12$^a$ cut in the two outer edges of the key 21. Both disks of each set may have at one point registering projections, as 22 22', while at another point one disk may be minus a projection, as at 23, thus forming what may be understood as "single" and "double" projections, the double projections of one set of disks preferably being opposite the single projections of the other set of disks, whereby the formation of many different combinations is rendered possible in a manner that will be readily understood. It will of course be understood that the projections may be of any desired form or construction; but in the present instance they are simply shown as triangularly shaped. Intermediate these disks, any desired number of which may be used, is located a member 16, having annular ribs 19 and grooves 20. This member in the present instance is shown as having a centrally-located recess $a$, with a pair of preferably-beveled ribs $b$ and $c$ of different widths at each side thereof, forming a groove $e$, which shape of tumbler necessitates the provision of a key having a centrally-located longitudinally-extending rib $a'$, preferably relatively wide, at each side of which is located a longitudinally-extending recess $b'$, registering with the relatively wide rib $b$ of the tumbler, said key also having at the outer side of each recess a longitudinally-extending rib $e'$ registering with the recess $e$ between the pair of ribs on the tumbler, the outer edges of the key having notches 12$^a$ corresponding in position and depth with the position and depth of the triangularly-shaped projections.

In the form shown the grooved portion of the tumbler is so shaped that it is substantially concave, so that a substantially convex surface is required on the key to coöperate therewith. In practice it is preferable to form the key substantially concavo-convex at its central portion, a suitable key-guide 25 being provided, having a convex face 26 located centrally thereof, such guide being pivotally secured in the chamber of the casing at its inner end by a pivot mounted in the side walls of said chamber and provided at its outer end with a pair of fingers or devices 27 for guiding the key into position to engage the tumbler.

To maintain the tumbler in its normal position and to return it to such position on the withdrawal of the key, a suitable spring is provided, shown in the present instance as a coiled spring 30, mounted on a projection of the tumbler, and one end of which is secured to the casing and the other end secured to such projection.

By forming the tumbler of disks it is obvious that they may be readily interchanged, while various shapes and formations of members 16 and disks may be used. These removable and interchangeable parts to any desired number are shown clamped in position intermediate the journal parts of the tumbler and are mounted on a spindle (not shown) extending through said tumbler. This tumbler may be connected with the bolt in any desired manner. It is shown having a tubular part at one end provided with quick internal threads 31, coöperating with correspondingly-formed threads 32 on the end of the bolt, by means of which the tumbler is shifted without rotation. The bolt 35 is shown comprising a pair of members, one a tubular member 36, carrying the threads, and the other, the bolt proper, having a slotted shank 37 working in said tubular member and slidingly connected therewith by a cross-pin 38. This bolt is maintained in its normal or outward position by a suitable spring 39, one end mounted on a projection or pin 40$^a$, located in the journal 13 of the tumbler, the opposite end projecting into the tubular member 36 and engaging the shank of the bolt to force the bolt-head outward when pressed inward by the jamb of the door on the closing of such door.

From the foregoing it will be seen that on the rotation of the tumbler the bolt will be shifted.

To prevent the picking of the lock, suitable means is provided comprising in the present instance locking means for the tumbler. In the form shown this locking means comprises primary and secondary locking means, each in the present instance comprehending two sets of locking devices. In my patent hereinbefore referred to the locking means was effective only after the tumbler was partially rotated. In the present instance one of the locking means is in position to prevent the rotation of the tumbler as well as the insertion of devices other than the proper key. This primary locking means in the form shown comprises a pair of members, one located at each side of the key-guide 25, and each is preferably formed as a spring member 40, both projecting inwardly slightly, so as to engage parts of the tumbler shown as projections or stop-faces 40', whereby in order to rotate the tumbler such springs must be forced laterally, so as to be disengaged from the tumbler. It is obvious, of course, that these members may be spring-controlled, and therefore the term "spring member" as used herein and in the claims is intended to cover each of these forms. In the present instance these locking devices engage projections of both sets of projections and are therefore in the nature of pawls. In addition to this primary locking means the lock is also provided with secondary locking means, shown comprising a pair of devices 42 and 43, pivotally secured in the casing and spring-controlled, the rear wall of the casing being provided with an opening 44 to permit the proper movement of such locking devices. These devices are located to coöperate with the projection-carrying disks and in their normal position engage portions of such disks which are not provided with projections, (see Fig. 7,) and so permit the tumbler to be rotated a predetermined distance. If this rotation be accomplished by anything but the proper key, the tumbler will be rotated until the first projection of each set comes opposite such locking devices, whereupon the springs will force the same into engagement with such projections, such devices thus acting in the nature of pawls, the projections constituting the ratchet-teeth, and so prevent the further rotation of the tumbler. When the proper key, however, is inserted, the end of the key engages both of these locking devices and disengages them from such projections, and so permits the further rotation of the tumbler by means of the key, the projections of the former engaging the recesses of the latter, and so turning the tumbler against the action of its spring, the return of the tumbler to its normal position being limited by a suitable stop 50. Instead of having the secondary locking devices spring-controlled they may be formed as springs, and therefore either form is intended to be covered in the claims by the term "spring-controlled."

To manipulate the lock, the key is inserted in the keyhole, which is formed with a curved slot 51, terminating at each side in a straight portion 52, whereby it is guided in position to engage the key-guide 25, which guides the inner end of the key into position to have its curved ends $12^b$ $12^c$ engage the primary locking devices and spread the same, so as to free the tumbler projections 40' therefrom, whereupon as the first recess or set of recesses in the key comes into register with the projection or sets of projections on the tumbler the tumbler is rotated. The further inward movement of the key brings its ends into position to engage the secondary locking means and raise the same, so as to permit the continued rotation of the tumbler, which movement withdraws the bolt in the manner hereinbefore set forth. On the withdrawal of the key the tumbler is rotated into its normal position, thereby forcing the bolt outwardly.

In the present instance the tumbler is shown as directly controlling the bolt or latch; but it is obvious that in some constructions a different organization of parts may be obtained. For instance, the present form of tumbler and locking means, or either separately, may be used with various organizations of locks, whereby the tumbler may control the movement of a part which in turn may control the bolt, and therefore when it is stated herein that the tumbler controls the bolt it is to be understood that this may be done either directly or indirectly, as found preferable in the practice and not necessarily as shown herein.

By organizing the locking devices in duplicate and at each side of the key-path the picking of the lock is rendered impossible by a wire or like device, since both locking devices would have to be manipulated at the same time. Not only this, but the primary locking device would have to be spread or shifted laterally, while the secondary locking devices would have to be shifted transversely of the direction of movement of said primary locking devices.

I claim as my invention—

1. In a lock, the combination of a movable tumbler having peripheral key-engaging projections, and means mounted independent of and engaging said tumbler for preventing, in the first instance, movement thereof until released by the proper key.

2. In a lock, the combination of a movable tumbler having peripheral key-engaging projections, and means, comprising independent devices mounted independent of and engaging said tumbler, for preventing, in the first instance, movement thereof until released by the proper key.

3. In a lock, the combination of a rotary tumbler having peripheral key-engaging projections, and shiftable means mounted independent of and engaging said tumbler for preventing, in the first instance, the rotation thereof until released by the proper key.

4. The combination of a rotary tumbler; means controlled thereby, and a spring member mounted independent of and directly engaging said tumbler for preventing, in the first instance, the rotation thereof until released by the proper key.

5. In a lock, the combination of a rotary tumbler; means controlled by said tumbler, and means, comprising a pair of spring members mounted independent of and engaging such tumbler, for preventing, in the first instance, the rotation thereof until released by the proper key.

6. The combination of a rotary tumbler having one or more projections, and one or more peripheral key-engaging projections; means controlled by said tumbler, and means located at one side of said first-mentioned projection or projections for coöperating therewith to prevent the rotation of the tumbler until released by the proper key.

7. The combination of a rotary tumbler, means controlled thereby and having two sets of key-engaging projections, and means located at one side of each set of projections for preventing the rotation of the tumbler until released by the proper key.

8. The combination with a bolt, of a rotary tumbler for controlling it and having two sets of projections, and a spring member located at one side of each set of projections for preventing the rotation of the tumbler until released by the proper key.

9. The combination of a rotary tumbler having one or more projections adapted to register with a recess or recesses in a key, and a device located in position to directly engage said key-engaging projection or projections and interfere with the rotation of said tumbler until released by the proper key.

10. The combination with a bolt, of a tumbler for controlling it and having projections adapted to register with recesses in a key, and means comprising a pair of devices in position to engage said key-engaging projections and interfere with the rotation of said tumbler until released by the proper key.

11. In a lock, the combination with a shiftable tumbler, of means controlled thereby; and automatically-operative primary and secondary locking means shiftable independently of each other, and both directly engaging and locking one of said parts against movement.

12. In a lock, the combination with a shiftable tumbler, of means controlled thereby, primary locking means engaging one of said parts and secondary locking means also engaging one of said parts, one of said locking means having its direction of movement transverse to the direction of movement of the other locking means.

13. In a lock, the combination with a shiftable tumbler, of means controlled thereby, and primary and secondary locking means engaging and locking said tumbler, one of said locking means having its direction of movement transverse to the direction of movement of the other locking means.

14. In a lock, the combination with a rotary tumbler, of means engaging and preventing the rotation thereof until released by the proper key, and means for interfering with the rotation thereof until released by the proper key, each of said means shiftable independently of the other.

15. In a lock, the combination with a rotary tumbler, of means engaging and preventing the rotation thereof until released by the proper key, and means for interfering with the rotation thereof until released by the proper key, each of said means shiftable independently of the other and one of said means comprising a pair of devices.

16. In a lock, the combination with a rotary tumbler, of means engaging and preventing the rotation thereof until released by the proper key, and means for interfering with the rotation thereof until released by the proper key, each of said means supported independently of the other means and each comprising a pair of devices.

17. In a lock, the combination with a rotary tumbler, of means directly engaging said tumbler for preventing the rotation thereof and comprising a spring member, and means for interfering with the rotation thereof and comprising a spring-controlled member.

18. In a lock, the combination with a rotary tumbler, of means directly engaging said tumbler for preventing the rotation thereof and comprising a pair of independent spring members, and means for interfering with the rotation thereof and comprising a pair of spring-controlled devices.

19. In a lock, the combination with a rotary tumbler having two sets of projections, a pair of devices in position to engage one projection of each set and prevent the rotation of said tumbler, and a pair of devices in position to engage one projection of each set after the tumbler has been partially rotated, thereby to interfere with the further rotation of said tumbler.

20. In a lock, the combination with a movable tumbler, of a bolt controlled thereby, and successively-effective automatically-operative means supported independently of each other directly engaging one of said parts and preventing the manipulation of the lock by means other than the proper key.

21. In a lock, the combination of a shiftable tumbler, and successively-effective means shiftable independently of each other directly engaging said tumbler to prevent the manipulation of the tumbler by means other than the proper key.

22. In a lock, the combination of a rotary tumbler having two sets of key-engaging projections located with a space intermediate thereof the projections of each set being located one in advance of the other; and means controlled by said tumbler on the rotation thereof.

23. In a lock, the combination with a rotary tumbler having two sets of key-engaging projections separated by one or more annular grooves and one or more annular ribs, and means controlled by said tumbler.

24. A lock having a rotary tumbler provided with two sets of projections separated by an annular groove.

25. A lock having a rotary tumbler provided with two sets of projections separated by an annular rib.

26. A lock having a rotary tumbler provided with a set of key-engaging projections, formed by a plurality of disks each having projections, one disk having projections some registering and others non-registering with projections of a companion disk.

27. A lock having a rotary tumbler provided with two sets of key-engaging projections, each set formed by a plurality of disks having projections.

28. A lock having a rotary tumbler provided with two sets of key-engaging projections, each set formed by a plurality of disks having projections, the projections of one disk of a set having some projections registering and others non-registering with projections of its companion disk, the registering projections of one set corresponding in position with the non-registering projections of the other set.

29. A lock having a rotary tumbler provided with two sets of key-engaging projections, each set formed by a plurality of disks having projections, the sets of projections being separated by an annular groove or rib.

30. A lock having a rotary tumbler provided with two sets of projections, each set formed by a plurality of disks having projections, the sets of projections being separated by a plurality of annular grooves and ribs.

31. A lock having, in combination with lock mechanism, a guide-plate comprising a centrally-located, longitudinally-extending curved portion having a relatively flat surface at each outer side thereof.

32. A lock having, in combination with lock mechanism, a guide-plate comprising a centrally-located, longitudinally-extending projection having at one side a relatively flat surface.

33. A lock having, in combination with lock mechanism, a guide-plate comprising a centrally-located, longitudinally-extending curved portion having a flat surface at each outer side thereof terminating at its outer end in a projection.

34. A lock having, in combination with lock mechanism, a guide-plate comprising a centrally-located, longitudinally-extending curved surface having at each outer side a flat surface, said plate having at each side thereof a resilient member coöperating with a part of said lock mechanism to prevent movement thereof.

35. A lock provided with a rotary tumbler comprised of a plurality of independent separable disks, each having one or more key-engaging projections.

36. A lock-casing having a face-plate provided with a keyhole comprising a curved portion and a pair of straight portions, one at each side thereof, and a guide-plate located therein provided with a longitudinally-extending, centrally-located portion and a pair of flat surfaces, one at each side thereof.

37. A lock having a rotary tumbler provided with a plurality of sets of key-engaging projections, each set carried by a disk removable and interchangeable with its companion disk.

38. A lock having a rotary tumbler provided with sets of key-engaging projections, each set carried by an independent disk.

39. In a lock, the combination of a shiftable bolt comprising a two-part member; a spring for normally throwing one of said parts outwardly, the other of said parts carrying threads; a rotary tumbler having a part thereof provided with threads coöperating with said bolt-threads, whereby on the rotation of said tumbler the bolt is shifted, said tumbler having two sets of key-engaging projections with a plurality of annular grooves and ribs located intermediate thereof; a pair of spring members for preventing the rotation of said tumbler until released by the proper key; and a pair of spring-actuated devices for interfering with the rotation of said tumbler until released by the proper key.

40. In a lock, the combination with a sliding bolt, of a rotary tumbler connected therewith for shifting it, said tumbler having two sets of separated projections, and means for locking said tumbler against rotation until released by the key.

41. In a lock, the combination with a sliding bolt, of a rotary tumbler connected therewith for shifting it, said tumbler having two sets of separated projections, and successively-effective means for locking said tumbler until released by the key.

42. In a lock, the combination with a sliding bolt, of a rotary tumbler connected therewith for shifting it, said tumbler having two sets of separated projections, and successively-effective means for locking said tumbler until released by the key, each of said means comprising a plurality of devices.

ALAN R. FERGUSSON.

Witnesses:
C. A. WEED,
C. L. RUSSELL.